(12) United States Patent
Hsu (10) Patent No.: US 12,327,940 B2
(45) Date of Patent: Jun. 10, 2025

(54) MECHANICAL CLAMP TO RELEASABLY HOLD ELECTRONIC DEVICES OF A COMPUTING SYSTEM

(71) Applicant: HEWLETT PACKARD ENTERPRISE DEVELOPMENT LP, Houston, TX (US)

(72) Inventor: Kueiching Hsu, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 559 days.

(21) Appl. No.: 17/729,289

(22) Filed: Apr. 26, 2022

(65) Prior Publication Data

US 2023/0344159 A1 Oct. 26, 2023

(51) Int. Cl.
| | |
|---|---|
| H01R 12/70 | (2011.01) |
| H01R 4/50 | (2006.01) |
| H01R 12/73 | (2011.01) |
| H01R 13/639 | (2006.01) |
| H01R 43/26 | (2006.01) |

(52) U.S. Cl.
CPC ....... *H01R 12/7029* (2013.01); *H01R 12/737* (2013.01); *H01R 13/639* (2013.01); *H01R 43/26* (2013.01); *H01R 4/50* (2013.01)

(58) Field of Classification Search
CPC ..... H01R 12/7029; H01R 4/50; H01R 13/639
See application file for complete search history.

(56) References Cited

U.S. PATENT DOCUMENTS

| | | | |
|---|---|---|---|
| 6,375,486 B1* | 4/2002 | Yu ................... | H01R 13/639 439/59 |
| 6,902,419 B2* | 6/2005 | Conway ............. | H01R 12/7005 439/347 |
| 2023/0344159 A1* | 10/2023 | Hsu .................... | H01R 12/7029 |

* cited by examiner

*Primary Examiner* — Briggitte R. Hammond
(74) *Attorney, Agent, or Firm* — Hewlett Packard Enterprise Patent Department (57) ABSTRACT

Example implementations relate to a mechanical clamp for a plurality of electronic devices of a computing system. The mechanical clamp includes a retainer section and a fastener section extended from the retainer section. The retainer section has an aperture, which engages with a free end portion of a first electronic device among the plurality of electronic devices to establish a connection between the mechanical clamp and the first electronic device. The fastener section has an elongated groove, which engages with a hook portion of a second electronic device among the plurality of electronic devices to releasably hold the first electronic device to the second electronic device that are detachably connected to each other. The second electronic device is disposed in the computing system and connected to an electronic component coupled to the computing system.

20 Claims, 7 Drawing Sheets

MECHANICAL CLAMP TO RELEASABLY HOLD ELECTRONIC DEVICES OF A COMPUTING SYSTEM

BACKGROUND

A graphics processing unit (GPU) card is a specialized electronic device, which includes one or more chips (or electronic circuits) to process graphics instructions and render results on an electronic display unit. Generally, the GPU card is connected to a computing system to handle graphics-related tasks of the computing system, and thereby relieve a main processor of the computing system from processing such graphics-related tasks. Computing systems which do not include a GPU card may have an unacceptably low performance while handling such graphics-related tasks.

BRIEF DESCRIPTION OF THE DRAWINGS

Various examples will be described below with reference to the following figures.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, and/or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. As used herein the term "releasably connected" may refer to temporary holding of a first device to a second device that are connected to each other via a component to prevent the first device from getting disconnected from the second device. Further, as used herein the term "detachably connected" may refer to separation of the component from the first and second devices.

For purposes of explanation, certain examples are described with reference to the components or elements illustrated in FIGS. 1-5. The functionality of the illustrated components or elements may overlap, however, and may be present in a fewer or greater number of components or elements. Further, all or part of the functionality of the illustrated elements may co-exist or be distributed among several geographically dispersed locations. Moreover, the disclosed examples may be implemented in various environments and are not limited to the illustrated examples. Further, the sequence of operations performed for releasably clamping a first electronic device to a second electronic device using a mechanical clamp described in connection with FIG. 5, is an example and is not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Such modifications and variations are intended to be included within the scope of this disclosure and protected by the following claims.

With the development of artificial intelligence technology, edge computing technology, supercomputing technology, or the like, demand for GPU cards for handling graphics-related tasks are ever-increasing. The GPU cards are specialized electronic devices, which include one or more chips (or electronic circuits) to process graphics instructions and render results on an electronic display unit. Generally, the GPU card is detachably connected to a computing system to handle graphics-related tasks of the computing system. Since the GPU cards are equipped to handle the graphics-related tasks, the main processors of the computing system may be relieved from processing such graphics-related tasks, thereby improving the performance of the computing system. When the computing system does not include the GPU card, the computing system may have an unacceptably low performance while handling such graphics-related tasks. Accordingly, a computer hardware manufacturer or vendor may pre-install one or more GPU cards in the computing system at a factory, to avoid the computing system facing such performance-related issues.

Generally, the GPU cards are disposed at the rear end of the computing system, arranged sequentially along a horizontal direction of the computing system, and connected to a motherboard of the computing system via a riser card, which is plugged into a motherboard of the computing system. The computing system may have internal space (e.g., height, length, width) constraints due to size constraints of a rack to permit rack-mounting of the computing system. Additionally, the rear end of the computing system may have limited internal space due to space occupied by other electronic devices, such as power supply devices, PCIe devices, etc. of the computing system. To efficiently use the available internal space of the computing system at the rear end, first the riser card is connected vertically to the motherboard, and then the GPU card is connected horizontally to the riser card. Such orientations of the riser card and the GPU card may efficiently make use of the available internal space of the computing system at the rear end. In particular, since the GPU card is horizontally oriented, the GPU card may efficiently use the available internal space to connect with the motherboard via the riser card, irrespective of its height. Accordingly, some of the computing systems may be equipped to accommodate one full height, full length (FHFL) GPU card in a slot (e.g., first slot) and two half height, half length (HHHL) GPU cards in other slots (e.g., second and third slots) to handle the graphics-related tasks of the computing system.

Typically, the riser card, which is vertically oriented, has an electronic plug that is inserted into the vertically oriented electronic socket of the motherboard to establish a connection between the riser card and the motherboard. Similarly, the GPU card, which is horizontally oriented, has another electronic plug that is inserted into the horizontally oriented electronic socket of the riser card to establish a connection between the GPU card and the motherboard via the riser card. Since the GPU card is horizontally oriented to establish a connection with the riser card and since the GPU card does not get adequate support from the chassis to withstand forces applied along the horizontal direction, the GPU card may easily pop out (or disconnect) from the riser card during certain circumstances. For instance, when the computing system is subjected to vibrations along the horizontal direction during transportation or service events, the GPU card may get disconnected from the riser card. Generally, a customer or vendor may not notice when the GPU card gets disconnected from the riser card. In such scenarios, the main processors of the computing system may be forced to handle both regular tasks and graphics-related tasks when the computing system is deployed in the data center environment, thereby facing unacceptably low performance. This may necessitate troubleshooting the computing system to rectify the performance-related issue. Accordingly, the computing system may be forced to undergo an otherwise avoidable shutdown to rectify the performance-related issues by reconnecting the GPU card to the riser card. Additionally, the shutdown of the computing system may also momentarily affect the workload execution capability of the data center environment. Further, the performance-related issue of the computing system may affect the brand reputation of the computer hardware manufacturer.

A technical solution to the aforementioned problems may include providing a mechanical clamp to releasably hold a first electronic device to a second electronic device that are connected to each other, and prevent them from disconnecting from each other. In some examples, the first electronic device is a GPU card and the second electronic device is the riser card. In one or more examples, the mechanical clamp may engage with the GPU card to establish a connection with the GPU card, and may further engage with the riser card to releasably hold the GPU card to the riser card. For example, the mechanical clamp may include a retainer section having an aperture, which engages with a free end portion of the GPU card to establish the connection between the mechanical clamp and the GPU card. The mechanical clamp may further include a fastener section having an elongated groove, which engages with a hook portion of the riser card to releasably hold the GPU card to the riser card. In one or more examples, in an engaged state of the retainer section with the free end portion, and of the fastener section with the hook portion, the mechanical clamp may prevent disconnection of the GPU card from the riser card. Accordingly, the mechanical clamp may provide adequate support to the GPU card to withstand the forces (e.g., vibrations) applied along a horizontal direction of a computing system, and thereby prevent the GPU card from being disconnected from the riser card. In some examples, in the engaged state, an amount of force that is required along the horizontal direction to pop out the mechanical clamp is greater than the amount of force that is generated from vibrations along the horizontal direction to pop out the GPU card from the riser card during transportation or service events. In one or more examples, an amount of force generated by vibrations may be in a range from about 11 lbs to about 15 lbs, and the amount of force that is required to pop out the mechanical clamp may be over 20 lbs. Accordingly, the amount of force that is required to pop out the mechanical clamp is greater than the force generated by the vibrations. Hence, the mechanical clamp may assist the GPU card to releasably hold to the riser card. In a disengaged state of the retainer section from the free end portion, and of the fastener section from the hook portion, the mechanical clamp may allow disconnection of the GPU card from the riser card. In some examples, the mechanical clamp may separate from the riser card and the GPU card to allow disconnection of the GPU card from the riser card.

In some examples, the riser card is disposed in the computing system and connected to an electronic component, such as a motherboard of the computing system, and the GPU card is disposed in a slot of the computing system and detachably connected to the riser card. For example, the riser card is vertically oriented and connected to the electronic component and the GPU card is horizontally oriented and connected to the riser card. In such examples, the mechanical clamp is slidably pushed towards the GPU card and the riser card by applying a linear force on a driver section of the mechanical clamp along a first direction (e.g., a first longitudinal direction), to engage the hook portion to the elongated groove and the free end portion to the aperture to clamp (or hold) the GPU card to the riser card. Further, the mechanical clamp is slidably pulled away from the GPU card and the riser card by applying the linear force on the driver section along a second direction (e.g., a second longitudinal direction) opposite to the first direction to disengage the hook portion from the elongated groove and the free end portion from the aperture to unclamp (or release) the GPU card from the riser card. In some examples, the linear force applied for engaging and disengaging the mechanical clamp may be about 5 pounds-force (lbs).

Accordingly, the mechanical clamp of the present disclosure may hold the GPU card to the riser card and assist one or more main processors of the computing system to have optimized performance, since the GPU card remains connected to the riser card. Further, the computing system may not be forced to undergo a shutdown to rectify the performance-related issues. Thus, the mechanical clamp may ensure that the computing system is continuously available without any downtime, to execute one or more workloads. Further, the mechanical clamp may have a design that is easy to manufacture and install, and may be cost-effective.

Accordingly, the present disclosure describes example implementations of a computing system having a mechanical clamp for releasably holding a plurality of electronic devices of the computing system. The mechanical clamp includes a retainer section and a fastener section extended from the retainer section. The retainer section has an aperture, which engages with a free end portion of a first electronic device among a plurality of electronic devices to establish a connection between the mechanical clamp and the first electronic device. The fastener section has an elongated groove, which engages with a hook portion of a second electronic device among the plurality of electronic devices to releasably hold the first electronic device to the second electronic device that are detachably connected to each other. The second electronic device is disposed in the computing system and connected to an electronic component coupled to the computing system. In some examples, the first electronic device is a graphics processing unit (GPU) card, the second electronic device is a riser card, and the electronic component is the motherboard of the computing system.

Figure 1A:
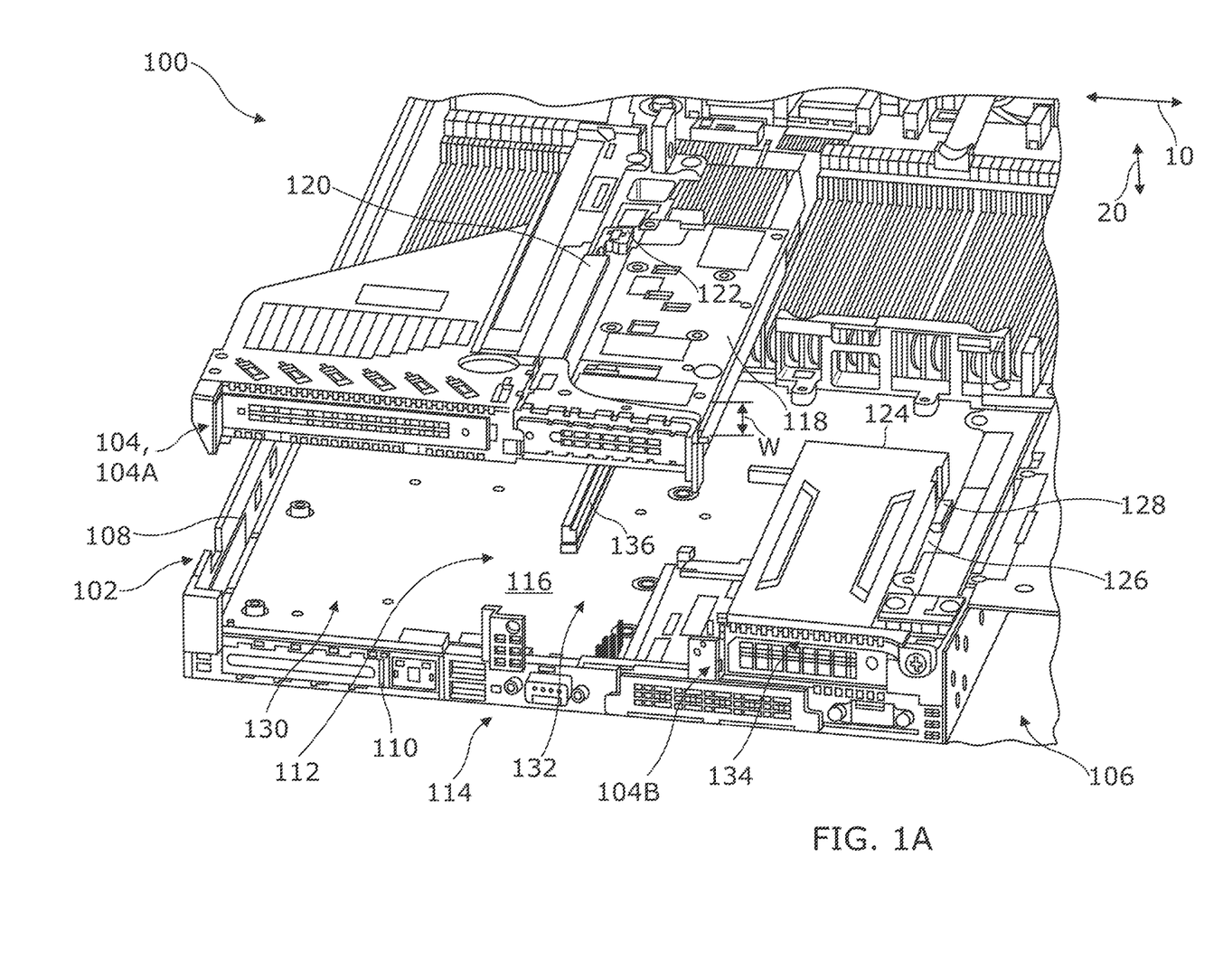
FIG. 1A illustrates a perspective rear view of a portion of a computing system having an electronic component and a plurality of electronic devices according to an example implementation of the present disclosure.
Figure 1B:
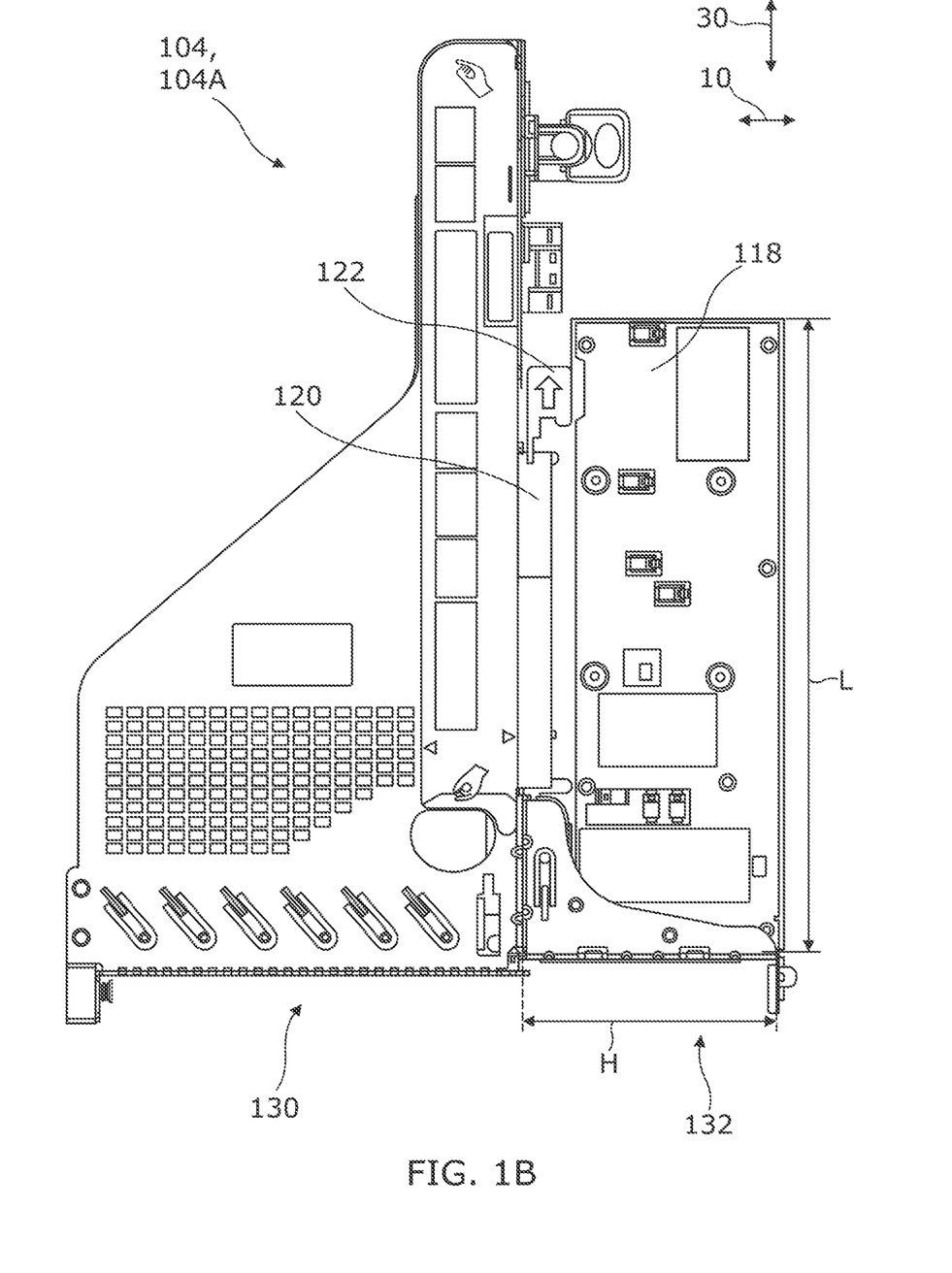
FIG. 1B illustrates a perspective view of an electronic device casing in the computing system of FIG. 1A according to the example implementation of the present disclosure.

Turning to the Figures, FIG. 1A depicts a perspective rear view of a portion of a computing system 100. FIG. 1B depicts a first electronic device casing 104A of the computing system 100. In the description hereinafter, FIGS. 1A and 1B are described concurrently for ease of illustration. In one or more examples, the computing system 100 may be a server system, a networking system, a storage system, or the like without deviating from the scope of the present disclosure.

In some examples, the computing system 100 includes a chassis 102, a plurality of electronic device casings 104, and a power supply device casing 106. The plurality of electronic device casings 104 and the power supply device casing 106 are disposed spaced apart from each other along a horizontal direction 10 of the computing system 100 and coupled to the chassis 102. The chassis 102 may be a box-shaped enclosure formed by a pair of walls 108 and a rear panel 110 that are connected to each other to define an interior space 112 at a rear end 114 of the chassis 102. In such examples, the chassis 102 may host an electronic component 116, the plurality of electronic device casings 104, and the power supply device casing 106 within the interior space 112 at the rear end 114 of the chassis 102.

In some examples, the plurality of electronic device casings 104 includes a first electronic device casing 104A and a second electronic device casing 104B. In the example of FIG. 1A, the first electronic device casing 104A is shown to be elevated from chassis 102 for ease of illustration of the electronic component 116 disposed in the chassis 102. Such an illustration of the first electronic device casing 104A should not be construed as a limitation of the present disclosure. The first electronic device casing 104A when disposed in the chassis 102 defines a first slot 130 and a second slot 132 of the chassis 102. In some examples, the first slot 130 and the second slot 132 are located adjacent to each other along the horizontal direction 10 of the computing system 100. In such examples, the first slot 130 may be configured to receive an electronic device (not shown) e.g., a graphics processing unit (GPU) card having a full height, full length (FHFL) form factor. The second slot 132 may be configured to receive a first electronic device 118 e.g., the GPU card having a half height, half length (HHHL) form factor. Further, the second electronic device casing 104B defines a third slot 134 of the chassis 102. In such examples, the third slot 134 may be configured to receive a third electronic device 124 e.g., the GPU card having the HHHL form factor. It may be noted that the HHHL form factor may be alternatively referred to as a low profile form factor. In one or more examples, the full height (FH) may be around 111.15 millimeters (mm) and the full length (FL) may be around 312 mm. Similarly, the half height (HH) may be around 68.9 mm, and the half length (HL) may be around 167.65 mm. In some examples, the power supply device casing 106 supports one or more power supply devices (not shown), which may be configured to receive supply power to the electronic components and devices of the computing system 100.

In some examples, the electronic component 116 is a motherboard of the computing system 100. The electronic component 116 is disposed in the chassis 102 and coupled to a base of the chassis 102 via a plurality of fasteners (not shown). The electronic component 116 may include a first electronic component socket 136 (or electronic component socket) positioned between the first slot 130 and the second slot 132 of the chassis 102 and extended vertically upwards along a vertical direction 20 from the electronic component 116. The electronic component 116 may further include a second electronic component socket (not shown) positioned proximate to the third slot 134 of the chassis 102 and extended vertically upwards along the vertical direction 20 from the electronic component 116. In one or more examples, each of the first electronic component socket 136 and the second electronic component socket may be a peripheral component interconnect (PCI) socket or a peripheral component interconnect express (PCIe) socket.

The plurality of electronic devices includes a first electronic device 118, a second electronic device 120, a third electronic device 124, and a fourth electronic device 126. As discussed herein, each of the first electronic device 118 and the third electronic device 124 is a GPU card having a low profile form factor or an HHHL form factor. In one or more examples, the GPU card may be a specialized electronic device, which includes one or more chips or electronic circuits (not shown) to process graphics instructions and render results on an electronic display unit of the computing system 100. In some non-limiting examples, the GPU card is at least one of a peripheral component interconnect (PCI) card or a peripheral component interconnect express (PCIe) card. Each of the first electronic device 118 and the second electronic device 124 has a height "H", a length "L", and a width "W". The height "H" is defined along the horizontal direction 10 of the computing system 100, the width "W" is defined along the vertical direction 20 of the computing system 100, and the length "L" is defined along a longitudinal direction 30 of the computing system 100. It may be noted herein that the longitudinal direction 30 may be perpendicular to the horizontal direction 10. Similarly, each of the second electronic device 120 and the fourth electronic device 126 is the riser card. In one or more examples, the riser card may be a printed circuit board (PCB) that provides the electronic component 116 e.g., the motherboard the option for adding additional electronic devices, for example, the first electronic device 118 and the third electronic device 124 to the computing system 100 to enhance performance of the computing system 100 to handle graphics-related tasks.

Figure 2A:
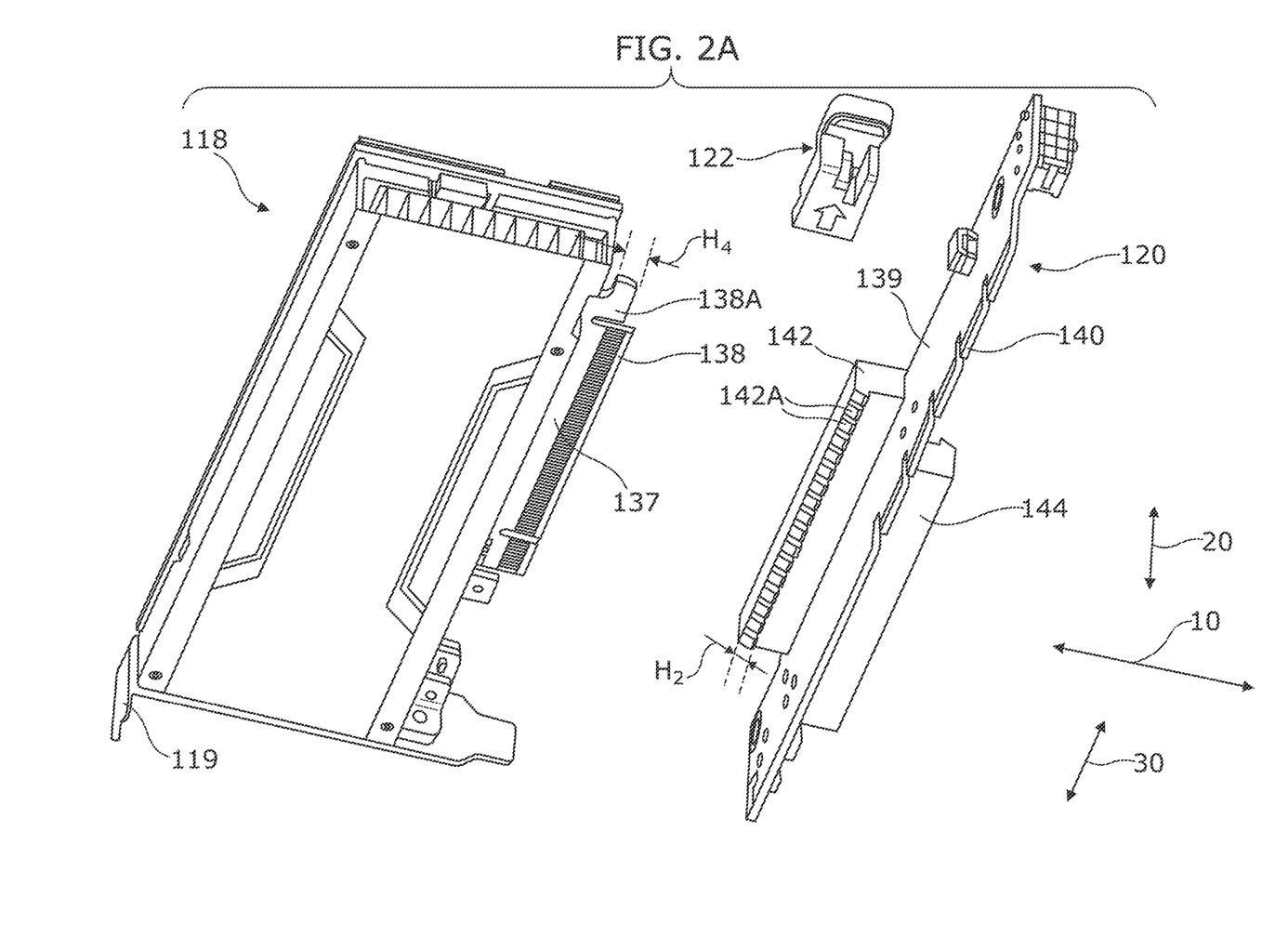
FIG. 2A illustrates a perspective view of a first electronic device, a second electronic device, and a mechanical clamp of FIGS. 1A and 1B, which are in disengaged state according to the example implementation of the present disclosure.
Figure 2B:
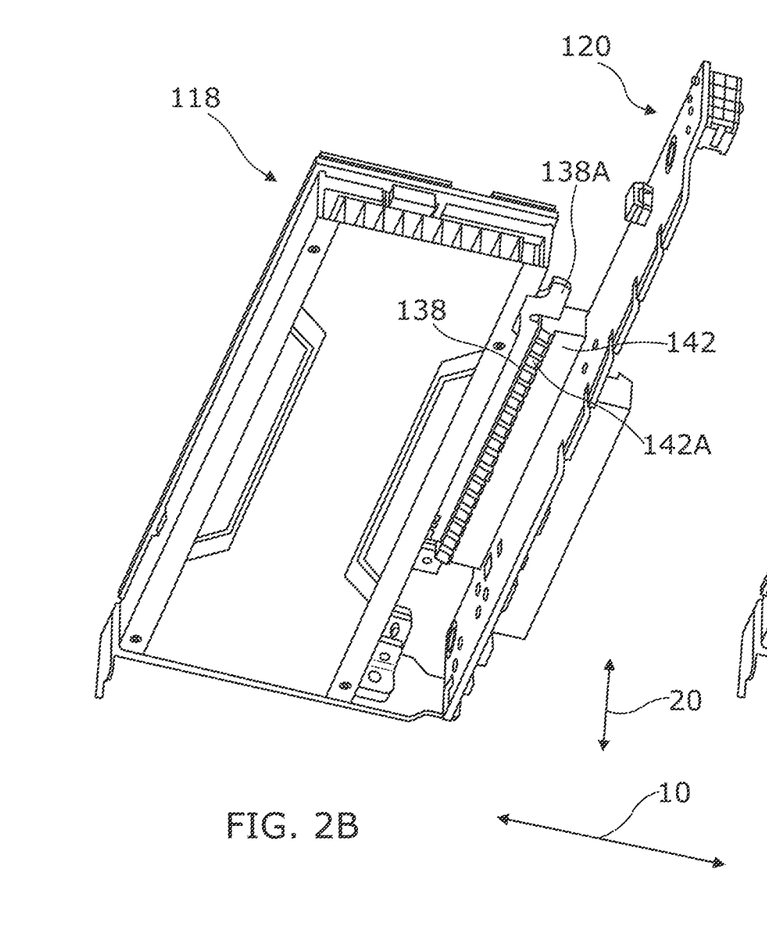
FIG. 2B illustrates a perspective view of the first electronic device and the second electronic device of FIG. 2A, which are detachably connected to each other according to the example implementation of the present disclosure.

Referring to FIGS. 1A-1B, each of the second electronic device 120 and the fourth electronic device 126 is connected to the electronic component 116. For example, the second electronic device 120 may include an electronic plug (not shown in FIGS. 1A and 1B) inserted into the first electronic component socket 136 of the electronic component 116 to connect the second electronic device 120 to the electronic component 116. Similarly, the fourth electronic device 126 may include another electronic plug (not shown in FIGS. 1A and 1B) inserted into the second electronic component socket of the electronic component 116 to connect the fourth electronic device 126 to the electronic component 116. Later, each of the first electronic device 118 and the third electronic device 124 is connected to the second electronic device 120 and the fourth electronic device 126 respectively. For example, the first electronic device 118 may include an electronic plug 138 (as shown in FIGS. 2A-2B) inserted into an electronic socket 142 (as shown in FIGS. 2A-2B) of the second electronic device 120 to detachably connect the first electronic device 118 to the second electronic device 120. The first electronic device 118 further includes a support element, such as a first flange 119 (as clearly shown in FIG. 2A) located at its rear end (not labeled). In one or more examples, the first flange 119 is coupled to the rear end 114 of the chassis 102 to adequately support the first electronic device 118 to withstand forces applied on the first electronic device 118 along the longitudinal direction 30. Similarly, the third electronic device 124 may include another electronic plug (not shown in FIGS. 1A and 1B) inserted into another electronic socket (not shown in FIGS. 1A and 1B) of the fourth electronic device 126 to detachably connect the third electronic device 124 to the fourth electronic device 126. The third electronic device 124 may also include another support element, such as a third flange (not shown) located at its rear end. In one or more examples, the third flange may be coupled to the rear end 114 of the chassis 102 to adequately support the third electronic device 124 to withstand the forces applied on the third electronic device 124 along the longitudinal direction 30.

However, the first electronic device 118 and the third electronic device 124 may not get adequate support from the chassis 102 to withstand the forces applied on the first electronic device 118 and the third electronic device 124 along the horizontal direction 10. Thus, at least one of the first electronic device 118 and the third electronic device 124 may easily pop out (or disconnect) from the second electronic device 120 and the fourth electronic device 126 respectively, during certain circumstances. For instance, when the computing system 100 is subjected to vibrations along the horizontal direction 10 during transportation or service events, the first electronic device 118 may get disconnected from the second electronic device 120 and/or the third electronic device 124 may get disconnected from the fourth electronic device 126. Generally, a customer or vendor may not notice when the first electronic device 118 is disconnected from the second electronic device 120 and/or the third electronic device 124 is disconnected from the fourth electronic device 126. In such scenarios, one or more main processors (not shown) of the computing system 100 may be forced to handle both regular and graphics tasks when executing one or more workloads, thereby facing unacceptably low performance. Accordingly, the computing system 100 of the present disclosure may further include a first mechanical clamp 122 (or a mechanical clamp) and a second mechanical clamp 128 to releasably hold the first electronic device 118 to the second electronic device 120 and the third electronic device 124 to the fourth electronic device 126, respectively. In such examples, the first mechanical clamp 122 may prevent the first electronic device 118 from being disconnected from the second electronic device 120 and the second mechanical clamp 128 may prevent the third electronic device 124 from being disconnected from the fourth electronic device 126. In other words, the mechanical clamp 122 may provide adequate support to the first electronic device 118 to withstand forces (e.g., vibrations) applied along the horizontal direction 10, thereby prevent the first electronic device 118 from being disconnected from the second electronic device 120. Similarly, the second mechanical clamp 128 may provide adequate support to the third electronic device 124 to withstand forces (e.g., vibrations) applied along the horizontal direction 10, thereby prevent the third electronic device 124 from being disconnected from the fourth electronic device 126. Accordingly, the first mechanical clamp 122 and the second mechanical clamp 128 of the present disclosure may assist the one or more main processors of the computing system 100 to have optimized performance, since the first electronic device 118 remains connected to the second electronic device 120 and the third electronic device 124 remains connected to the fourth electronic device 126. Accordingly, the computing system 100 may not be forced to undergo a shutdown to rectify the performance-related issues, thereby ensuring that the computing system 100 is continuously available without any downtime to execute one or more workloads. The structure of the first mechanical clamp 122 and/or the second mechanical clamp 128, and the method of clamping the electronic devices using the mechanical clamps 122, 128 are explained in greater detail below.

Figure 2C:
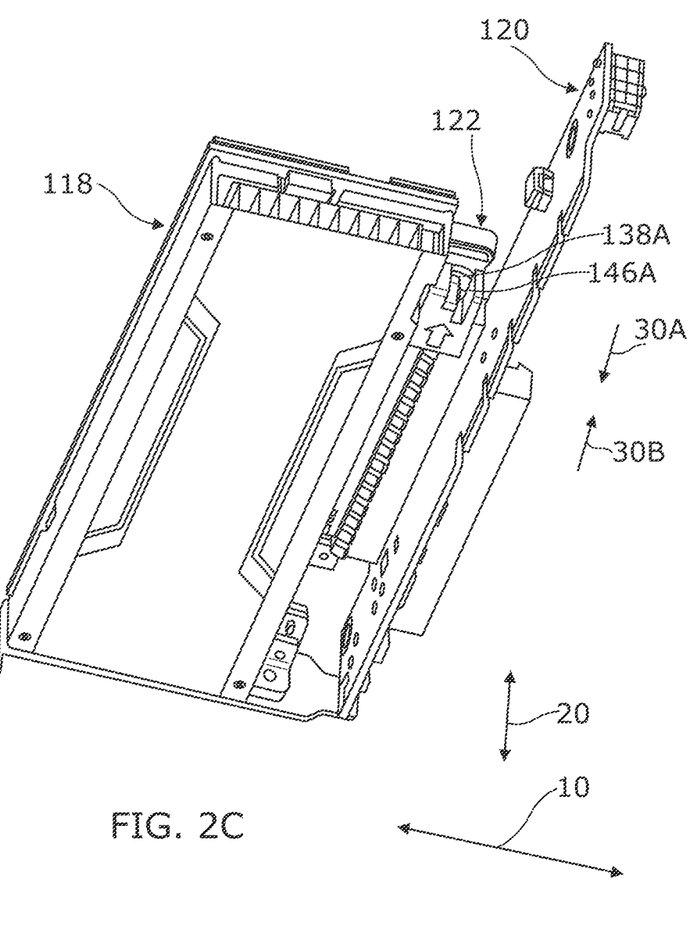
FIG. 2C illustrates a perspective view of the mechanical clamp releasably holding the first electronic device to the second electronic device of FIG. 2B, which are detachably connected to each other according to an example implementation of the present disclosure.
Figure 3:
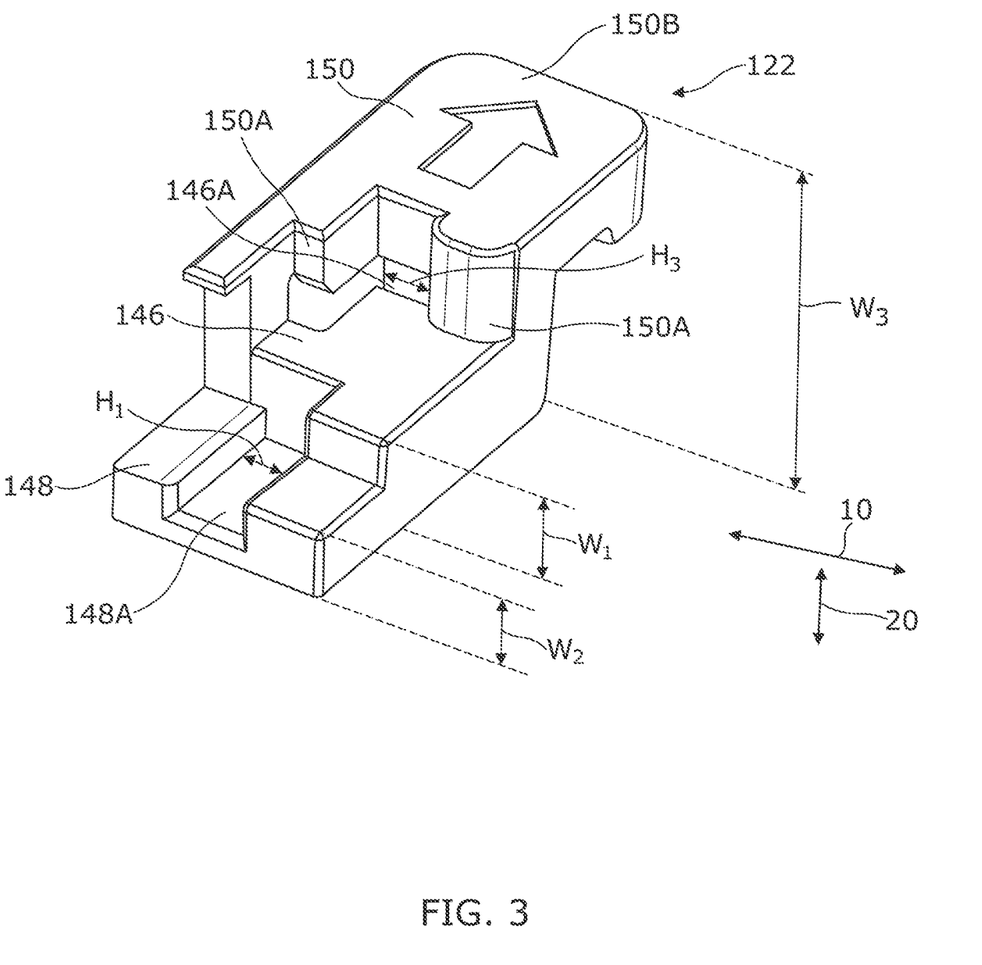
FIG. 3 illustrates an enlarged perspective view of the mechanical clamp of FIGS. 2A and 2C according to an example implementation of the present disclosure.

FIG. 2A depicts a perspective view of a first electronic device 118, a second electronic device 120, and a mechanical clamp 122 of FIGS. 1A and 1B, which are in a disengaged state. FIG. 2B depicts a perspective view of the first electronic device 118 and the second electronic device 120 of FIG. 2A, which are detachably connected to each other. FIG. 2C depicts a perspective view of the mechanical clamp 122 releasably holding the first electronic device 118 to the second electronic device 120 of FIG. 2B, which are detachably connected to each other. FIG. 3 depicts an enlarged perspective view of the mechanical clamp 122 of FIGS. 3A-3C. In the description hereinafter, FIGS. 2A-2C and FIG. 3 are described concurrently for ease of illustration. It may be noted herein that the third electronic device 124, the fourth electronic device 126, and the second mechanical clamp 128 are not discussed herein for ease of illustration and brevity of the description, and such non-description of those components should not construed as a limitation of the present disclosure.

Referring to FIG. 2A, the first electronic device 118 includes a first printed circuit board (PCB) 137 having a first electronic plug 138 protruded outwards from the first PCB 137 along the horizontal direction 10 of the computing system 100. The first electronic plug 138 may be interconnected to one or more chips of the first electronic device 118 via one or more traces (not shown) formed in the first PCB 137. In one or more examples, the first electronic plug 138 may be at least one of a PCI plug or PCIe plug. The first electronic device 118 may further include a free end portion 138A protruding outwards along the longitudinal direction 30, from a peripheral side portion of the first electronic plug 138. In one or more examples, the first electronic device 118 is oriented along the horizontal direction 10 of the computing system 100.

The second electronic device 120 includes a second PCB 139, a second electronic plug 140, a first electronic socket 142, and a second electronic socket 144. The first electronic socket 142 and the second electronic socket 144 are disposed on opposite surfaces of the second PCB 139 and each protrude outwards along the horizontal direction 10 from the respective surface of the second PCB 139. The second electronic plug 140 protrudes downwards from the second PCB 129 along the vertical direction 20 of the computing system 100. The second electronic plug 140 may be interconnected to the first electronic socket 142 and the second electronic socket 144 via one or more traces (not shown) formed in the second PCB 139. In one or more examples, the second electronic plug 140 may be at least one of the PCI plug or PCIe plug. Similarly, each of the first electronic socket 142 and the second electronic socket 144 may be at least one of the PCI socket or PCIe socket. The first electronic socket 142 may include a plurality of hook portions 142A that are spaced apart from each other and formed at the bottom surface of the first electronic socket 142. Each hook portion 142A protrudes downwards along the vertical direction 20 from the bottom surface of the first electronic socket 142. In one or more examples, the second electronic device 120 is oriented along the vertical direction 20 of the computing system 100.

Referring to FIG. 2A and FIG. 3, the mechanical clamp 122 is a clamping element, which is designed to hold two or more electronic devices together such that the two or more electronic devices do not get disconnected from each other. In some examples, the mechanical clamp 122 may be made of a polymer material, a rubber, a sheet metal, or the like. In one or more examples, the mechanical clamp 122 includes a retainer section 146, a fastener section 148, and a driver section 150. The fastener section 148 and the driver section 150 extend in opposite directions from the retainer section 146. For example, a first end portion of retainer section 146 is connected to the fastener section 148 and a second end portion of the retainer section 146 is connected to the driver section 150. Accordingly, the fastener section 148 has a first end portion that is connected to the retainer section 146 and a second free-end portion. Similarly, the driver section 150 has a first end portion connected to the retainer section 146 and a second free-end portion. In certain examples, the retainer section 146 has a first width "$W_1$", the fastener section 148 has a second width "$W_2$", and the driver section 150 has a third width "$W_3$", where each of the first, second, and third widths "$W_1$", "$W_2$", "$W_3$" extend along the vertical direction 20 of the computing system 100.

The retainer section 146 has a profile along its top surface, which is substantially similar to a profile of the free end portion 138A of the first electronic device 118. In some examples, the retainer section 146 having the same profile to that of the free end portion 138A may assist the retainer section 146 to seat the free end portion 138A when the mechanical clamp 122 slides over the first electronic device 118. Further, the retainer section 146 includes an aperture 146A at the second end portion and is positioned below the driver section 150. The fastener section 148 includes an elongated groove 148A formed along a top surface and extended between the first end portion and the second free-end portion of the fastener section 148. The driver section 150 has a first ergonomic feature 150A at the first end portion of the driver section and located outside the aperture 146A. Further, the driver section 150 has a second ergonomic feature 1506 formed at the second free-end portion. The first ergonomic feature 150A may include a tab with a flat portion and rounded corner portions. The second ergonomic feature 1506 may include another tab with a flat portion and rounded corner portions. The first ergonomic feature 150A and the second ergonomic feature 150B may allow the mechanical clamp 122 to be easily pulled and pushed to shift between an engaged state and a disengaged state. In some examples, the mechanical clamp 122 is a discrete component, which can be separated from the first electronic device 118 and the second electronic device 120. In some examples, the elongated groove 148A has a height "$H_1$" and each hook portion 142A has the height "$H_2$", both extending along the horizontal direction 10 of the computing system 100. In some examples, the height "$H_1$" is in the range from about 3.5 millimeters (mm) to 4 mm and the height "$H_2$" is in the range from about 3.5 mm to 4 mm. Similarly, the aperture 146A has a height "$H_3$" and the free end portion 138A has a height "$H_4$", both extending along the horizontal direction 10 of the computing system 100. In some examples, the height "$H_3$" is in the range from about 1.2 mm to 1.7 mm and the height "$H_4$" is in the range from about 1.2 mm to 1.7 mm. In one or more examples, the height "$H_1$" of the elongated groove 148A and the height "$H_2$" of the hook portion 142A are substantially equal, thereby allowing the hook portion 142A to interlock (or press-fit) with the elongated groove 148A, when the mechanical clamp 122 slides on the second electronic device 120. Similarly, the height "$H_3$" of the aperture 146A and the height "$H_4$" of the free end portion 138A are substantially equal, thereby allowing the free end portion 138A to protrude (or press-fit) along the aperture 146A, when the mechanical clamp 122 slides on the first electronic device 118.

As discussed herein with reference to FIGS. 1A and 1B, the second electronic plug 140 of the second electronic device 120 is inserted into the electronic component socket 136 (as shown in FIG. 1A) of the electronic component 116 to connect the second electronic device 120 to the electronic component 116. Since the electronic component socket 136 is oriented along the vertical direction 20, the second electronic device 120 must be oriented along the vertical direction 20 to insert the second electronic plug 140 into the electronic component socket 136 and establish the connection between the second electronic device 120 and the electronic component 116.

Referring to FIG. 2B, the first electronic plug 138 of the first electronic device 118 is inserted into the first electronic socket 142 of the second electronic device 120 to detachably connect the first electronic device 118 to the second electronic device 120. Since the first electronic socket 142 is oriented along the horizontal direction 10, the first electronic device 118 must be oriented along the horizontal direction 10 to insert the first electronic plug 138 into the first electronic socket 142 and establish the connection between the first electronic device 118 and the second electronic device 120. In such examples, the free end portion 138A of the first electronic device 118 is located outside the first electronic socket 142 and protrudes outwards along the longitudinal direction 30 from the peripheral side portion of the first electronic plug 138. Similarly, each hook portion 142A of the second electronic device 120 is located outside the first electronic socket 142 and protrudes downwards along the vertical direction 20 from the bottom surface of the first electronic socket 142.

Referring to FIG. 2C, the mechanical clamp 122 is slidably pushed towards the first electronic device 118 and the second electronic device 120 by applying a linear force on the driver section 150 along a first direction 30A (e.g., a first longitudinal direction), to engage the hook portion 142A (e.g., one or more hook portions) to the elongated groove 148A and the free end portion 138A to the aperture 146A. In some examples, an amount of linear force that is required to slidably push the mechanical clamp 122 to engage with the first electronic device 118 and the second electronic device 120 may be about 5 lbs. In some examples, upon sliding the mechanical clamp 122 over the first electronic device 118, a friction force established therebetween may allow the mechanical clamp 122 to align in the correct location on the first electronic device 118 and protrude the free end portion 138A through the aperture 146A.

Similarly, the mechanical clamp 122 may be slidably pulled away from the first electronic device 118 and the second electronic device 120 by applying the linear force on the driver section 150 along a second direction 30B (e.g., a second longitudinal direction) opposite to the first direction 30A, to disengage the hook portion 142A (e.g., one or more hook portions) from the elongated groove 148A and the free end portion 138A from the aperture 146A. In some examples, the amount of linear force that is required to slidably pull the mechanical clamp 122 to disengage from the first electronic device 118 and the second electronic device 120 may be about 5 lbs. In some examples, in an engaged state of the retainer section 146 with the free end portion 138A and of the fastener section 148 with the hook portion 142A, the mechanical clamp 122 prevents disconnection of the first electronic device 118 from the second electronic device 120. For example, the mechanical clamp 122 may provide adequate support to the first electronic device 118 to withstand forces (e.g., vibrations) applied along the horizontal direction 10, thereby prevent the first electronic device 118 from being disconnected from the second electronic device 120. In some examples, the amount of force required to pop out the mechanical clamp 122 is over 20 lbs, which is greater than the amount of force generated by vibrations, which is about 11 lbs. Thus, in the engaged state, the mechanical clamp 122 may assist the first electronic device 118 to releasably hold to the second electronic device 120. However, in a disengaged state of the retainer section 146 from the free end portion 138A and of the fastener section 148 from the hook portion 142A, the mechanical clamp 122 allows disconnection of the first electronic device 118 from the second electronic device 120.

In one or more examples, the second width "$W_2$" of the fastener section 148 is less than the first width "$W_1$" of the fastener section 148 to prevent interference of the fastener section 148 with the free end portion 138A when the mechanical clamp 122 slides over the free end portion 138A to engage with the first electronic device 118. Similarly, the third width "$W_3$" of the driver section 150 is greater than the first width "$W_1$" of the retainer section 146 to allow the user to easily access the mechanical clamp 122 to move between the engaged state and the disengaged stage.

Figure 4A:
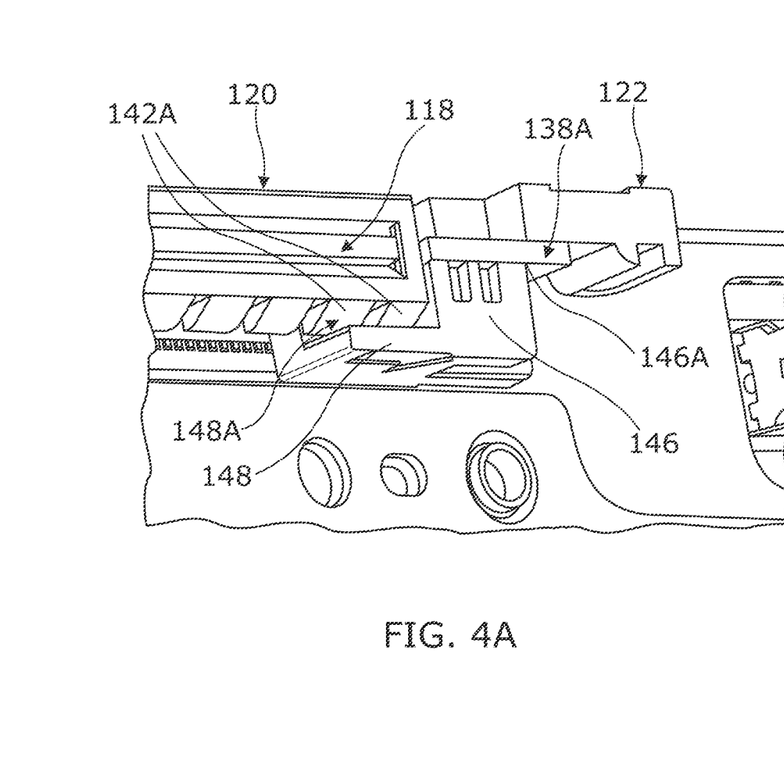
FIG. 4A illustrates a perspective cross-sectional view of the computing system having the mechanical clamp releasably holding the first electronic device to the second electronic device of FIG. 2C according to an example implementation of the present disclosure.
Figure 4B:
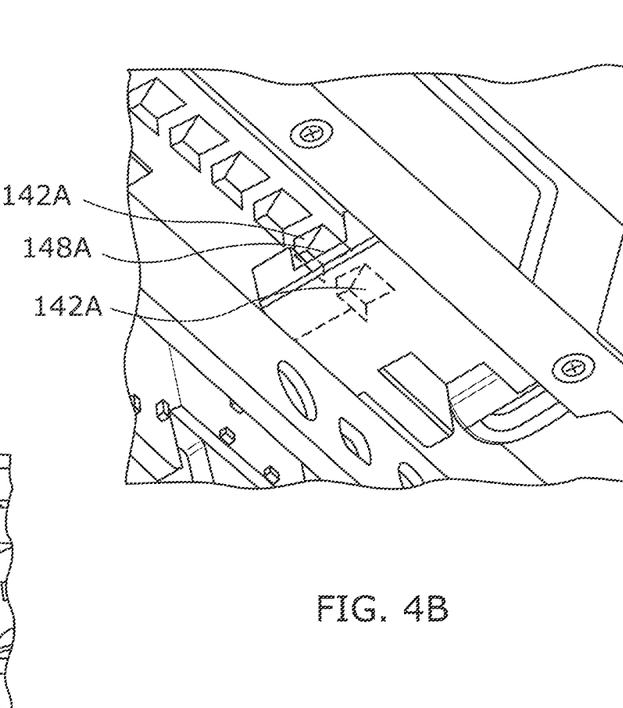
FIG. 4B illustrates a perspective bottom view of the computing system having the mechanical clamp releasably holding the first electronic device to the second electronic device of FIG. 4A according to an example implementation of the present disclosure.
Figure 5:
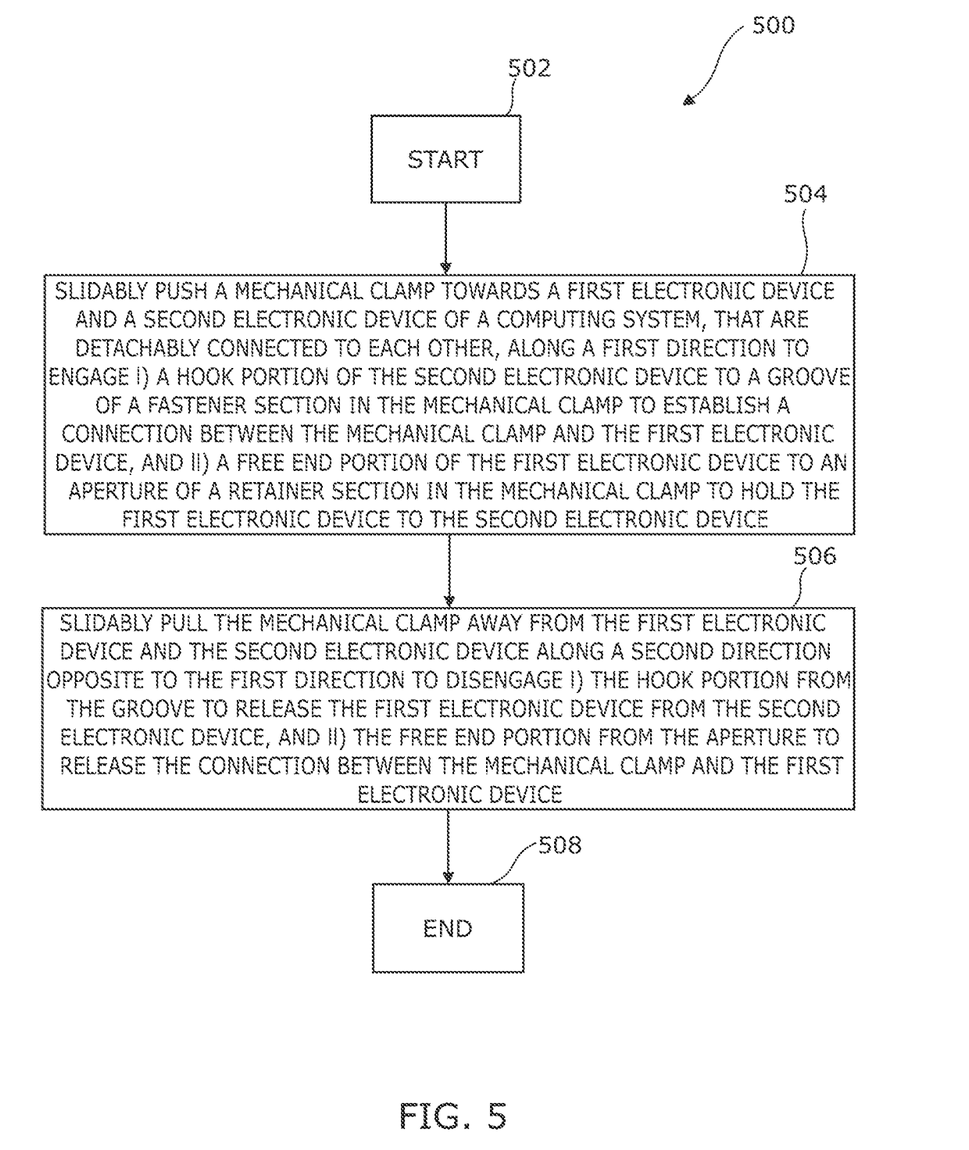
FIG. 5 illustrates a flowchart depicting a method of releasably holding a first electronic device to a second electronic device that are detachably connected to each other, using a mechanical clamp according to an example implementation of the present disclosure.

FIG. 4A depicts a perspective cross-sectional view of the computing system 100 having the mechanical clamp 122 releasably holding the first electronic device 118 to the second electronic device 120 of FIG. 2C. FIG. 4B depicts a perspective bottom view of the computing system 100 having the mechanical clamp 122 releasably holding the first electronic device 118 to the second electronic device 120 of FIG. 4A. In the description hereinafter, FIGS. 4A-4B are described concurrently for ease of illustration.

In some examples, in the engaged state (or clamped state) of the mechanical clamp 122, the free end portion 138A protrudes through the aperture 146A to establish the connection between the mechanical clamp 122 and the first electronic device 118. Further, the elongated groove 148A interlocks with one or more hook portions 142A to releasably hold the first electronic device 118 to the second electronic device 120. Accordingly, in the engaged state (or the clamped state) of the retainer section 146 with the free end portion 138A and of the fastener section 148 with the hook portion 142A, the mechanical clamp 122 prevents disconnection of the first electronic device 118 from the second electronic device 120. However, in the disengaged state (or unclamped state) of the retainer section 146 from the free end portion 138A and of the fastener section 148 from the hook portion 142A, the mechanical clamp 122 allows disconnection of the first electronic device 118 from the second electronic device 120.

FIG. 5 is a flowchart depicting a method 500 of releasably clamping a first electronic device to a second electronic device that are detachably connected to each other, using a mechanical clamp. It should be noted herein that the method 500 is described in conjunction with FIGS. 1A-1B, FIGS. 2A-2C, FIG. 3, and FIGS. 4A-4B for example.

The method 500 starts at block 502 and continues to block 504. At block 504, the method 500 includes slidably pushing a mechanical clamp towards a first electronic device and a second electronic device of a computing system, that are detachably connected to each other in order to move the mechanical clamp to an engaged state. For example, the mechanical clamp slides along a first direction to engage i) a hook portion of the second electronic device to a groove of a fastener section in the mechanical clamp to establish a connection between the mechanical clamp and the first electronic device and ii) a free end portion of the first electronic device to an aperture of a retainer section in the mechanical clamp to hold the first electronic device to the second electronic device. Accordingly, in the engaged state of the retainer section with the free end portion, and of the fastener section with the hook portion, the mechanical clamp prevents disconnection of the first electronic device from the second electronic device. The method 500 continues to block 506.

At block 506, the method 500 includes slidably pulling the mechanical clamp away from the first electronic device and the second electronic device that are detachably connected to each other to move the mechanical clamp to a disengaged state. For example, the mechanical clamp slides along a second direction opposite to the first direction to disengage i) the hook portion from the groove to release the first electronic device from the second electronic device, and ii) the free end portion from the aperture to release the connection between the mechanical clamp and the first electronic device. Accordingly, in the disengaged state of the retainer section from the free end portion and of the fastener section from the hook portion, the mechanical clamp allows the disconnection of the first electronic device from the second electronic device.

In some examples, the second electronic device is disposed in the computing system and connected to an electronic component coupled to the computing system. In one or more examples, the electronic component is a motherboard, the first electronic device is a graphics processing unit (GPU) card, and the second electronic device is a riser card.

In some examples, the GPU card may have a low profile form factor. In one or more examples, the GPU card may be one of a peripheral component interconnect (PCI) card or a peripheral component interconnect express (PCIe) card. The method 500 ends at block 508.

Various features as illustrated in the examples described herein may be implemented in a computing system having a mechanical clamp. Accordingly, the mechanical clamp may releasably hold a GPU card to a riser card, thereby allowing the GPU card to be continuously available for handling graphics tasks of the computing system. Thus, the mechanical clamp may assist one or more main processors of the computing system to have optimized performance, since the GPU card remains connected to the riser card. Accordingly, the computing system may not be forced to undergo a shutdown to rectify the performance-related issues, thereby ensuring that the computing system is continuously available without any downtime, to execute one or more workloads. Further, the mechanical clamp may have a simple design that is easy to manufacture and install and may be cost-effective.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A mechanical clamp for a plurality of electronic devices of a computing system, comprising:
    a retainer section to engage with a free end portion of a first electronic device among the plurality of electronic devices to establish a connection between the mechanical clamp and the first electronic device; and
    a fastener section extended from the retainer section, having an elongated groove to engage with a hook portion of a second electronic device among the plurality of electronic devices to releasably hold the first electronic device to the second electronic device that are detachably connected to each other, and wherein the second electronic device is disposed in the computing system and connected to an electronic component coupled to the computing system,
    wherein the retainer section has a first width, and the fastener section has a second width less than the first width to prevent interference of the fastener section with the free end portion when the mechanical clamp slides over the free end portion to engage with the first electronic device.

2. The mechanical clamp of claim 1, wherein the mechanical clamp is detachable from the first electronic device and the second electronic device.

3. The mechanical clamp of claim 1, wherein, in an engaged state of the retainer section with the free end portion and of the fastener section with the hook portion, the mechanical clamp prevents disconnection of the first electronic device from the second electronic device, and wherein, in a disengaged state of the retainer section from the free end portion and of the fastener section from the hook portion, the mechanical clamp allows disconnection of the first electronic device from the second electronic device.

4. The mechanical clamp of claim 1, wherein the retainer section has an aperture, wherein the free end portion protrudes through the aperture to establish the connection between the mechanical clamp and the first electronic device, and wherein the elongated groove interlocks with the hook portion to releasably hold the first electronic device to the second electronic device.

5. The mechanical clamp of claim 4, wherein the elongated groove has a height in a range from about 3.5 millimeters (mm) to 4 mm, the hook portion has the height in the range from about 3.5 mm to 4 mm, wherein the aperture has the height in the range from about 1.2 mm to 1.7 mm, and wherein the free end portion has the height in the range from about 1.2 mm to 1.7 mm.

6. The mechanical clamp of claim 4, further comprising a driver section extended from the retainer section,
    wherein the mechanical clamp is slidably pushed towards the first electronic device and the second electronic device by applying a linear force on the driver section along a first direction, to engage the hook portion to the elongated groove and the free end portion to the aperture, and
    wherein the mechanical clamp is slidably pulled away from the first electronic device and the second electronic device by applying the linear force on the driver section along a second direction opposite to the first direction to disengage the hook portion from the elongated groove and the free end portion from the aperture.

7. The mechanical clamp of claim 1, wherein the electronic component is a motherboard of the computing system, the first electronic device is a graphics processing unit (GPU) card, and the second electronic device is a riser card, wherein the GPU card has a low profile form factor, and wherein the GPU card is one of a peripheral component interconnect (PCI) card or a peripheral component interconnect express (PCIe) card.

8. A computing system comprising:
    an electronic component coupled to the computing system;
    a first electronic device and a second electronic device among a plurality of electronic devices, wherein the first electronic device is detachably connected to the second electronic device, and wherein the second electronic device is disposed in the computing system and connected to the electronic component, and wherein the electronic component is a motherboard, the first electronic device is a graphics processing unit (GPU) card, and the second electronic device is a riser card; and
    a mechanical clamp comprising:
        a retainer section to engage with a free end portion of the first electronic device to establish a connection between the mechanical clamp and the first electronic device; and
        a fastener section extended from the retainer section, having an elongated groove to engage with a hook portion of the second electronic device to releasably hold the first electronic device to the second electronic device,
    wherein the retainer section has a first width, and the fastener section has a second width less than the first width to prevent interference of the fastener section with the free end portion when the mechanical clamp slides over the free end portion to engage with the first electronic device.

9. The computing system of claim 8, wherein the mechanical clamp is detachable from the first electronic device and the second electronic device.

10. The computing system of claim 8, wherein, in an engaged state of the retainer section with the free end portion and of the fastener section with the hook portion, the mechanical clamp prevents disconnection of the first electronic device from the second electronic device, and wherein, in a disengaged state of the retainer section from the free end portion and of the fastener section from the hook portion, the mechanical clamp allows the disconnection of the first electronic device from the second electronic device.

11. The computing system of claim 8, wherein the retainer section has an aperture, wherein the free end portion protrudes through the aperture to establish the connection between the mechanical clamp and the first electronic device, and wherein the elongated groove interlocks with the hook portion to releasably hold the first electronic device to the second electronic device.

12. The computing system of claim 11, wherein the elongated groove has a height in a range from about 3.5 millimeters (mm) to 4 mm, the hook portion has the height in the range from about 3.5 mm to 4 mm, wherein the aperture has the height in the range from about 1.2 mm to 1.7 mm, and wherein the free end portion has the height in the range from about 1.2 mm to 1.7 mm.

13. The computing system of claim 11, further comprising a driver section extended from the retainer section,
wherein the mechanical clamp is slidably pushed towards the first electronic device and the second electronic device by applying a linear force on the driver section along a first direction, to engage the hook portion to the elongated groove and the free end portion to the aperture, and
wherein the mechanical clamp is slidably pulled away from the first electronic device and the second electronic device by applying the linear force on the driver section along a second direction opposite to the first direction to disengage the hook portion from the elongated groove and the free end portion from the aperture.

14. The computing system of claim 8, wherein the first electronic device comprises an electronic plug including the free end portion, wherein the second electronic device comprises an electronic socket including the hook portion, and wherein the electronic plug is engaged with the electronic socket to detachably connect the first electronic device to the second electronic device.

15. The computing system of claim 8, wherein the GPU card has a low profile form factor, and wherein the GPU card is one of a peripheral component interconnect (PCI) card or a peripheral component interconnect express (PCIe) card.

16. A method comprising:
slidably pushing a mechanical clamp towards a first electronic device and a second electronic device of a computing system, that are detachably connected to each other, along a first direction to engage i) a hook portion of the second electronic device to an elongated groove of a fastener section in the mechanical clamp to establish a connection between the mechanical clamp and the first electronic device, and ii) a free end portion of the first electronic device to an aperture of a retainer section in the mechanical clamp to hold the first electronic device to the second electronic device; and
slidably pulling the mechanical clamp away from the first electronic device and the second electronic device along a second direction opposite to the first direction to disengage i) the hook portion from the elongated groove to release the first electronic device from the second electronic device, and ii) the free end portion from the aperture to release the connection between the mechanical clamp and the first electronic device,
wherein the retainer section has a first width, and the fastener section has a second width less than the first width to prevent interference of the fastener section with the free end portion when the mechanical clamp slides over the free end portion to engage with the first electronic device.

17. The method of claim 16, wherein, in an engaged state of the retainer section with the free end portion and of the fastener section with the hook portion, the mechanical clamp prevents disconnection of the first electronic device from the second electronic device, and wherein, in a disengaged state of the retainer section from the free end portion and of the fastener section from the hook portion, the mechanical clamp allows disconnection of the first electronic device from the second electronic device.

18. The method of claim 16, wherein the second electronic device is disposed in the computing system and connected to an electronic component coupled to the computing system, wherein the electronic component is a motherboard of the computing system, the first electronic device is a graphics processing unit (GPU) card, and the second electronic device is a riser card, wherein the GPU card has a low profile form factor, and wherein the GPU card is one of a peripheral component interconnect (PCI) card or a peripheral component interconnect express (PCIe) card.

19. The method of claim 16, wherein the retainer section has an aperture, wherein the free end portion protrudes through the aperture to establish the connection between the mechanical clamp and the first electronic device, and wherein the elongated groove interlocks with the hook portion to releasably hold the first electronic device to the second electronic device.

20. The method of claim 19, wherein the elongated groove has a height in a range from about 3.5 millimeters (mm) to 4 mm, the hook portion has the height in the range from about 3.5 mm to 4 mm, wherein the aperture has the height in the range from about 1.2 mm to 1.7 mm, and wherein the free end portion has the height in the range from about 1.2 mm to 1.7 mm.

* * * * *